United States Patent [19]

Das et al.

[11] 4,351,752

[45] Sep. 28, 1982

[54] DETACKIFIED AQUEOUS SIZING COMPOSITION COMPRISING LIQUID POLYMER AND FREE RADICAL GENERATOR

[75] Inventors: Balbhadra Das, Allison Park, Pa.; Dennis M. Fahey, Lexington, N.C.

[73] Assignee: PPG Industries, Inc., Pittsburgh, Pa.

[21] Appl. No.: 49,841

[22] Filed: Jun. 18, 1979

[51] Int. Cl.$^3$ .................. C08L 91/00; D02G 3/00
[52] U.S. Cl. ..................... 523/401; 65/3.43; 428/391; 428/392; 523/502; 524/542; 524/762; 524/828; 524/836
[58] Field of Search .............. 524/839; 260/29.7 H, 260/29.7 R, 29.7 UA, 29.6 NR, 29.2 E, 29.2 EP, 29.2 UA, 29.2 N, 29.6 ME

[56] References Cited

U.S. PATENT DOCUMENTS

| | | | |
|---|---|---|---|
| 3,837,892 | 9/1974 | Marzocchi | 57/140 G |
| 3,837,898 | 9/1974 | McCombs et al. | 260/29.7 H |
| 3,936,285 | 2/1976 | Maaghul | 65/3 C |
| 4,009,317 | 2/1977 | Chase et al. | 428/378 |
| 4,286,019 | 8/1981 | Fahey | 260/29.7 H |

OTHER PUBLICATIONS

Cols. 1-2, 35-36, USP 3306875-Hay.
The Naming & Indexing of Chemical Compounds from Chemical Abstracts, vol. 56, 1962, p. 49.
Lee & Neville, "Epoxy Resins", pp. 6-18, McGraw Hill (1957).
Paul F. Bruins, "Epoxy Resins", Tech. pp. 31-38, Interscience Pub. (1968).
Modern Plastics Ency., pp. 77-78, vol. 54, No. 10A, McGraw Hill.

Primary Examiner—Harold D. Anderson
Attorney, Agent, or Firm—Kenneth J. Stachel

[57] ABSTRACT

A sizing composition and method of preparing sized glass fiber strand is provided to produce sized glass fiber strand that has reduced tackiness. The sizing composition has a low molecular weight liquid polymer selected from the group consisting of styrene-butadiene copolymer, acrylonitrile-butadiene copolymer or hydroxy or carboxy derivatives of said copolymers, epoxy resins, polyester resins, or polyurethane resins that are free radically curable; and a free radical precurser selected from the group consisting of peroxides, hydroperoxides in an amount in the range of about 0.2 to 5 parts per hundred parts of liquid polymer in said sizing composition; or the said liquid polymer that can be treated with radiation to produce an equivalent amount of free radicals. The method of producing the less tacky sized glass fiber strands includes treating the glass fibers with the sizing composition, drying the sized glass fiber strand to produce the free radicals and slightly cross-link the liquid polymer or when peroxides or hydroperoxides are absent to treat the sized glass fiber strand to a source of radiation sufficient in energy and time to produce an equivalent amount of free radicals as that produced by the peroxides or hydroperoxides from the liquid polymer.

6 Claims, No Drawings

DETACKIFIED AQUEOUS SIZING COMPOSITION COMPRISING LIQUID POLYMER AND FREE RADICAL GENERATOR

BACKGROUND OF THE INVENTION

The present invention relates to detackified polymeric sizing compositions for fiberous materials, and to a method of producing detackified, sized fiberous materials. More particularly, the present invention is directed to detackified polymeric sizing compositions for treating glass fibers and methods for producing detackified, sized glass fibers.

In the commercial production of glass fiber strands, a multitude of fine glass filaments are combined to yield the glass fiber strand. These fine glass filaments are formed by the rapid attenuation from molten cones of glass at the tips of small orifices in a bushing, for example, as in the operation shown in U.S. Pat. No. 2,133,238. In order to protect the glass filaments from interfilament abrasion, the filaments are coated during their formation with a sizing composition to protect the glass fiber strand against handling equipment during further processing, and to give the glass fiber strand integrity and workability for any standard textile or reinforcement use. After the filaments have been treated with sizing composition, they are gathered together into a strand and the glass fiber strand is wound around a rapidly rotating drum to form a package. Since the sizing composition used to treat the glass filaments is an aqueous composition, the treated glass filaments gathered into a strand and wound into a package generally contain enough moisture to give the package a wet appearance. In order to remove some of the moisture from the package to produce dry glass fiber strand, the packages are dried in ovens for a desired period of time.

The sizing compositions usually contain one or more components such as a lubricant, a film former or binder, a coupling agent, and possibly other additives like flexibilizing agents, wetting agents, stabilizers, plasticizers and emulsifying agents and the like. When glass fibers are used to reinforce polymers, either thermoplastic or elastomeric polymers, the size contains, at a minimum, a lubricating agent and a film former. The types of film formers that can be used in the sizing composition include polyesters, polyvinylpyrrolidones, epoxy resins, polyamides, polyacrylates, polyvinyl alcohols, starches, and homopolymers and copolymers of butadiene and derivatives thereof such as hydroxy, carboxy, nitrile, etc. terminated butadiene polymers. When the size contains a film forming material, the tacky nature of the specific polymer used as the film former can impede further processing of glass fibers treated with a sizing composition containing the polymer. The processing difficulties arise during various further production operations such as when the glass fiber strand has to be removed from the dried wound package, when the glass fiber strands are chopped for use as reinforcement, and when the strands are processed in a manner that entails the contact of the tacky surfaced strand with contact points such as guide eyes, rollers, chopping blades and the like.

The tack problem in removing the glass fiber strand from the package occurs because the strands are wound onto the package at rapid rates and dried, and as a consequence any tackiness of the sizing composition results in inter-adhesion or blocking of adjacent or contacting segments of the strand when it is removed from the package. The tack problem also occurs in the additional processing of the glass fiber strand to produce woven products, roving, and the like, wherein a myriad of packages are placed on a creel and the numerous glass fiber strands removed from the packages are passed over contact points, guide eyes and the like to a common destination. This tack problem in such an operation would reduce the efficiency of the glass fiber strands reaching the common destination in a satisfactory condition, because the tackiness would lead to build-up on the passages, contact points and guide eyes thereby increasing the frequency of breakage of the strands and the fuzziness of the strands. In the production of chopped roving products, the tack problem would decrease the efficiency of chopping by causing some strands to be chopped improperly and by causing chopped strands not to break apart. If the chopping of the roving is to occur in spray-up apparatus where the strands are chopped and sprayed simultaneously, the tack problem would reduce the efficiency of the roving separating into individual strands where each strand would contain several hundred glass fibers. This operation could lead to clumps or aggregates of glass fibers upon the mold or forming surface on which the glass fiber polyester resin mixture is sprayed.

The art in trying to reduce the amount of tack for glass fiber strand treated with sizing compositions containing polymer film formers has developed a number of fillers, anti-blocking agents, and detackifiers that can be added to the sizing composition that is used to treat the glass fibers. The addition of such agents to the sizing composition is not without accompanying disadvantages. Disadvantages that may result from addition of such agents include: diminished protective capability supplied by the sizing composition to the glass fibers, increased susceptibility of the glass fibers to moisture adsorption, and increased dryability and stiffness of the glass fiber strands. Such disadvantages would decrease the effectiveness of the glass fiber strands as reinforcement for either the thermoplastic polymers and/or elastomeric materials.

Another approach to reducing the tack of tacky resins used in the sizing compositions was proposed in U.S. Pat. No. 3,409,577 (Wong et al). This approach was to use a detackifying agent which was believed to have one end which was non-tacky by reason of a particular type of detackifying group. The detackifier adheres to the surface of tacky materials in an oriented manner with the non-tacky group projecting from and covering the surface of the normal tacky materials. The type of detackifying agents useful in this approach were those having the following formula:

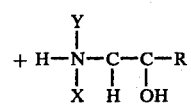

wherein Y is a member of the class consisting of hydrogen, an alkyl radical of a chain length of from 1 to 7 carbon atoms, and X is a member of the group consisting of:

(1) an aliphatic hydrocarbon having a chain length of from 1 to 7 carbon atoms and including at least one hydroxy group, (2) —OH, and (3) —(OR″) and OH, wherein R″ is an aliphatic hydrocarbon radical having a chain length of from 1 to 6 carbon atoms, and n is an integer from 1 to 25, and R is a long chain organo molecule having a molecular weight up to approximately 10,000 devoid of the terminal group given above at its other end.

It is an object of the present invention to provide a sizing composition for glass fibers that produces sized glass fiber strand with reduced tackiness without incurring the disadvantages of using detackifying agents in the sizing composition.

It is an additional object of the present invention to provide a method for producing sized glass fiber strands that have reduced tackiness.

It is a further additional object of the present invention to provide a sizing composition for treating glass fibers that yield treated glass fibers capable of having better wetting, better penetration and better encapsulation of the glass fibers when coated with an elastomeric coating to produce elastomeric coated cord.

It is another further additional object of the invention to provide a sizing composition for treating glass fibers that yields a treated glass fiber strand capable of having good wetting, penetration, and encapsulating characteristics for use in reinforcement of thermoplastic polymer matrices.

SUMMARY OF THE INVENTION

In accordance with the present invention sized glass fiber strand is produced that has reduced tackiness while the sizing on the glass retains good characteristics of wetting, penetration and encapsulation for the glass fibers.

The aqueous sizing composition of the present invention for treating glass fibers to yield sized glass fiber strand having reduced tackiness has one or more low molecular weight liquid polymers selected from styrene-butadiene copolymer, acrylonitrile-butadiene copolymers, or hydroxy or carboxy terminated derivatives of these two copolymers; epoxy resins, or polyester resins, or polyurethane resins having unsaturation or a abstractable hydrogen; and an amount of free radical generator in the range of about 0.2 to about 5 parts per hundred parts of polymer. Other additives can be included in the sizing composition and these additives include film-former modifiers, wetting agents, coupling agents, additional coupling agents, additional film-formers, stabilizers and plasticizers, etc. When plasticizers are included in the sizing composition, the plasticizers that can be used are those that are in the solid state on the sized glass fiber strand at the temperatures of use for the sized glass fiber strand.

The low molecular weight styrene-butadiene copolymers and acrylonitrile-butadiene copolymers that constitute liquid polymers for the purpose of the present invention include these copolymers and their hydroxy or carboxy terminated derivatives, having a molecular weight of about 1,500 grams/mole to about 25,000 grams/mole. The epoxy resin that constitute liquid polymers for the purpose of this invention are those epoxy resins that have a molecular weight in the range of about 800 grams/mole to about 25,000 grams/mole and have some unsaturation or abstractable hydrogen in the polymer backbone or in a pendant position. For the purpose of this invention, the polyester resins that constitute liquid polymers include polyester resins that have some unaturation or a abstractable hydrogen from the polymer backbone or from a pendant position and have a molecular weight in the range of about 600 grams/mole to 25,000 grams/mole. Polyurethane resins that constitute liquid polymers for the purpose of the present invention include those polyurethane polymers having some unsaturation or a removable hydrogen from the polymer backbone or from a pendant position and a number average molecular weight in the range of about 600 grams/mole to about 25,000 grams/mole and a weight average molecular weight in the range of about 800 grams/mole to 30,000 grams/mole.

The free radical generator useful in the present invention is selected from peroxides and hydroperoxides of free radicals such as lower alkyl groups, eg., methylene, in an amount equivalent to an amount of peroxide or hydroperoxide in the range of about 0.2 to about 5 parts per hundred parts of polymer. The lower alkyl free radicals can also be generated by any form of high frequency radiation.

DETAILED DESCRIPTION OF THE INVENTION

It is believed that the composition, method, and treated glass fibers of the present invention, without limitation by this belief, involve production of detackified sized glass fiber strand because the polymer film former of the sizing composition can be cross-linked to an extent that is not too detrimental to the flexibility of the sized glass fiber strand or to the compatibility with the polymer or elastomeric matrices in which the sized glass fiber strands are to be used as reinforcement.

The liquid polymers of the present invention are low moleculr weight liquid polymers, some of a polar nature while others are of a non-polar nature, to provide better wetting, better penetration and better encapsulation of the glass fibers to be treated. The amounts of liquid polymer used as the film former in the sizing composition are those amounts known to those skilled in the art of sizing compositions for glass fibers.

When styrene-butadiene copolymers or acrylonitrile-butadiene copolymers are used as the liquid polymers for the film former in the sizing composition, these copolymers or their hydroxy or carboxy terminated derivatives provide excellent compatibility for sized glass fibers with elastomeric latices that may be used to coat the sized glass fiber strands. The copolymers can be any proportion of the monomers known to those skilled in the art. The preferred liquid polymer used in the present invention is a hydroxy derivative of the styrene-butadiene copolymer that has a 75:25 ratio of butadiene to styrene and hydroxyl number of 36.5 mg KOH/gm. An example of a 75:25 butadiene-styrene copolymer hydroxy derivative is designated "poly bd ®" liquid resin CS-15 produced by ARCO Polymers, Inc. of Philadelphia, Pa. An example of a hydroxy derivative of acrylonitrile butadiene copolymer that can be used as the liquid polymer of the present invention is designated "poly bd ®" liquid resin CN-15 available from ARCO Polymers, Inc., Philadelphia, Pa. This copolymer has a ratio of 15:85 acrylonitrile to butadiene on a weight percent basis and a hydroxyl number of 33.7 mg KOH/gm.

An example of the epoxy polymer that can be used as the liquid polymer of the present invention is the epoxy polymer having unsaturation in the polymer backbone and available from Dow Chemical Co. under the trade designation "Derakane 790" vinyl ester epoxy resin.

The liquid polymer that is a polyester resin can be mixtures of unsaturated alkyd resins having a plurality of alpha-beta ethylenically unsaturated groups with ethylenically unsaturated monomers. The alkyd resin may be prepared by reacting together a polyhydric alcohol with a polycarboxylic acid or acid anhydride which contains alphabeta ethylenic unsaturation. Saturated polycarboxylic acids are also frequently included in the mixture to modify the properties of the polyester resin. Examples of polycarboxylic acids that can be used in producing the alkyd resin include maleic usually in the form of the anhydride, and fumaric acid, trimellitic acid, itaconic, aconitic, citraconic, and mesaconic acids, phthalic acid usually in the form of the anhydride and other acids or anhydrides with benzenoid unsaturation. Typical polyhydric alcohols which can be used to produce the alkyd resin include ethylene glycol, diethylene glycol, propylene glycols, dipropylene glycols, and butylene glycols. The alkyd resin can be produced in a method known to those skilled in the art.

The polyurethane resin that can be the liquid polymer of the present invention can be any suitable blocked or unblocked polyurethane such as Texin polyurethanes available from Mobay Chemical Corporation and the Toylar polyurethanes available from Uniroyal, Inc. and the Isonate ® or PAPI ® polyurethanes available from Upjohn Company. Also, the liquid polyurethane or isocyanates can be the types of polymers having hydroxyl, carboxyl, or other functional groups that react to form urethanes.

The free radical generator used to cross-link the liquid polymers that are the film formers in the sizing composition can be peroxides or hydroperoxides in an amount of about 0.2 to 5 parts per hundred parts of resin (phr) and preferably 0.5 to 3 phr. Examples of peroxides that can be used as a free radical generator in the composition and method of the present invention are Dicup R and Vulcup R peroxides available from Hercules Inc. Other organic peroxides, for example benzoyl peroxide, lauroyl peroxide, dicumyl peroxide, tertiary butyl peroctoate, ditertiary butyl peroctoate, cyclohexanone peroxide, ditertiary butyl peroxide can be used as the free radical generator. Also the free radicals may be generated in an amount equivalent to the free radicals generated from the addition of peroxide or hydroperoxide by the treatment of the liquid polymer with high energy radiation. This high energy radiation is that known to those skilled in the art for producing free radicals similar to those generated from the addition of peroxide or hydroperoxide of liquid polymers on the backbone or on a pendant position. The application of this high energy radiation is that known to those skilled in the art for producing free radicals from organic compounds. Several non-exclusive ways of treating the glass fiber strands having a sizing composition containing the low molecular weight liquid polymers include drying the strands to remove excess water, and treating the strands with gamma rays produced from Cobalt 60, or with high energy radio waves.

Any additives known to those skilled in the art for addition to sizing compositions for treating glass fibers can be added to the sizing composition containing the liquid polymer of the present invention with the presence of free radicals. The amounts of these additives are those usually used by those skilled in the art in producing sizing compositions. The additives that should not be used in the sizing composition of the present invention are those that would add tack to the sized glass fibers. For example, a plasticizer that is not a solid at a temperature of use of the sized glass fibers cannot be added in large quantities to the sizing composition of the present invention containing the liquid polymers and the free radicals. Also, free radical inhibitors or additives that would be cross-linked by the free radical generator or the high frequency radiation should not be used in large quantities in the composition of liquid polymer and free radicals of the present invention. The presence of large quantities of such compounds would decrease the availability of the free radical generator or of free radicals to cross-link the liquid polymers and produce detackified sized glass fibers.

The method of producing the sizing composition of the present invention, containing the liquid polymers and free radicals to cross-link the liquid polymer, preferably involves the use of the free radicals to be generated from peroxide or hydroperoxide rather than from a high frequency radiation, wherein the peroxide or hydroperoxide is added directly to the liquid polymer and then an emulsion is formed in the manner usually used by those skilled in the art in producing sizing compositions for treating glass fibers.

In the preferred method of producing detackified sized glass fiber strand, the sizing composition containing the liquid polymer and the peroxides and hydroperoxides contacts the glass fibers as they are formed. More preferably the glass fibers are contacted with a sizing composition of the present invention within a few feet of the bushing and cone from which they are being drawn as more fully described in U.S. Pat. No. 3,718,449. The sizing composition of the present invention may also be applied by conventional roller applications such as described in U.S. Pat. No. 2,873,718. The glass fibers are formed and wound into glass fiber strand on a forming package by the conventional methods. Drying of the sized glass fiber strand may be accomplished by passing the sized strand through a microwave oven, a forced hot-air oven or through other means which impart sufficient heat to remove the water contained in the sizing composition and to activate the free radical generator to produce free radicals and cross-link the liquid polymer to the degree necessary to reduce the tackiness of the sized glass fibers.

In the alternative embodiment where free radicals are to be generated by high frequency radiation, the microwave oven would serve to produce the free radicals and remove moisture from the sizing composition.

The following examples are illustrative of the sizing composition and method of producing sized glass fiber strands according to the preferred and alternative embodiments of the present invention.

| Illustrative Example | |
|---|---|
| Component | Amount (in grams) |
| Mixture A | |
| Polybutadiene homopolymer low Mol. Wt. (Arco Poly bd R45HT) | 113 gms. |
| Bis peroxide (Vulcup R) | 1 gm. |
| Polyoxyethylene (POE) (5) sorbitan monolaurate (Tween ® 81) | 18 gms. |
| POE (21) sorbitan monolaurate (Tween ® 21) | 75 gms. |
| Polyoxyethylated (POE) vegetable oil nonionic surfactant (Emulphor EL-719) | 18 gms. |
| Hot Water | 300 gms. |
| Mixture B | |
| Hot Water | 600 gms. |

-continued

Illustrative Example

| Component | Amount (in grams) |
|---|---|
| Polyamino-functional polyamide resin (amine value 370–400) (General Mills Versamid 140) | 60 gms. |
| Partially amidated polyamine (Emery Lube 6717) | 36 gms. |
| Mixture C | |
| Water | 3,000 |
| Polyethylene glycol (Carbowax 300) | 75 |
| Wax Emulsion (Mobilcer Q) | 38 |
| Antioxidant (Bostex 294) | 20 gms. |
| Amino-silane coupling agent (A-1100) | 75 gms. |

Dilute with water to 11,400 grams to give 4% solids.

The presence of the antioxidant is to stabilize the polybutadiene homopolymer and does not have any adverse effects on rubber coating tests.

The above size was used to size K-15 glass fiber strand in the usual manner. This included drawing glass fibers from a bushing and applying the sizing composition of the fibers during their formation. The individual sized fibers were gathered together into strands and collected on a forming tube mounted on a 20.32 centimeter collet that rotates at 4,100 revolutions per minute.

The sized glass fiber strands on a plurality of forming packages were dried in an oven at 130° C. for 11 hours. The dried strands were removed from the forming packages and coated with coating composition dip containing styrene-butadiene-vinyl pyridine terpolymers among other components. The coated glass fiber strands were tested in various procedures.

EXAMPLE 1

A sizing composition having the formulation of Table 1 was prepared in 11,400 gram batch and used to treat glass fibers, in the same method as used in the Illustrative Example.

TABLE 1

| Component | Amount (in grams) |
|---|---|
| Mixture A | |
| Styrene-butadiene copolymer with hydroxy termination (Arco's Poly bd CS-15) | 113 |
| POE (5) sorbitan monolaurate (Tween 81) | 18 |
| POE (20) sorbitan (Tween 20) | 75 |
| Polyoxyethylated (POE) vegetable oil nonionic surfactant (Emulphor EL-719) | 18 |
| Hot Water | 200 |
| Silicon defoaming agent (SAG 470) | 2 ml. |
| Mixture B | |
| Water | 200 |
| Polyamino-functional polyamide resin amine value 370-400 (General Mills Versamid 140) | 60 |
| Partially amidated polyamine (Emery Lube 6717) | 36 |
| Hot Water | 600 |
| Cold Water | 3000 |
| Polyethylene glycol (Carbowax 300) | 75 |
| Wax emulsion (Mobilcer Q) | 38 |
| Gamma-aminopropyltri-ethoxysilane (A-1100) | 75 |

TABLE 1-continued

| Component | Amount (in grams) |
|---|---|

The components of Mixture A were combined and mixed for 15–20 minutes and cold water was added to the emulsion formed from Mixture A, and melting was continued. Then Mixture B was prepared and added to the emulsion and then the remaining components were added.

EXAMPLE 2

A sizing composition having the formulation of Table 2 was prepared in a 11,400 gram batch and used to treat glass fibers in the same method of Example 5.

TABLE 2

| Component | Amount (in grams) |
|---|---|
| Mixture A | |
| Styrene-butadiene copolymer with hydroxyl termination | 113 |
| POE (5) sorbitan monolaurate (Tween 81) | 18 |
| POE (20) sorbitan monolaurate (Tween 20) | 75 |
| (POE) Vegetable Oil nonionic surfactant (Emulphor EL-719) | 18 |
| Bis peroxide (Vulcup R) | 1 |
| Hot Water | 200 |
| Silicon defoamer (SAG-470) | 2 ml. |
| Cold Water to emulsion | 200 |
| Mixture B | |
| Hot Water | 600 |
| Polyamino-functional polyamide resin (amine value 37400 General Mills Versamid 140) | 60 |
| Partially amidated polyamine (Emery Lube 6717) | 36 |
| Cold Water | 3000 |
| Polyethylene glycol (Carbowax 300) | 75 |
| Wax emulsion | 38 |
| Gamma-amino propyltri ethoxysilane (A-1100) | 75 |

Dilute to 11,400 gms.

The sizing composition of Example 1 and Example 2, were used to treat K-37 fiber glass strands. The LOIs (Loss of Ignition) of the sized glass fiber strands were 0.3 to 0.4. The amount of fuzz in running was acceptable showing that the sized glass fiber strand had reduced tackiness.

The sized glass fiber strands produced with sizing composition of Example 2 was coated with a styrene-butadiene-vinyl pyridine latex-containing coating dip and tested for adhesion. The coated glass fiber strands had reduced tackiness of the sized glass fiber strands.

The results of the testing of the coated strands of Example 1 and Example 2 were compared with those results obtained with the coated strand of the Illustrative Example. The comparison, shown in Table A below, indicates the reduced tackiness of the coated strands of Example 1 and 2 over that of the Illustrative Example by the comparison of data on fuzz.

TABLE A

| Sample | Rated | Fuzz |
|---|---|---|
| Illustrative Example Coated Strand | Poor | Some |
| Example 1 | — | Low |

TABLE A-continued

| Sample | Rated | Fuzz |
|---|---|---|
| Coated Strand Example 2 Coated Strand | — | Low |

EXAMPLE 3

Glass fibers drawn from a bushing were sized with the sizing composition of the present invention having the formulation of Table 3 during the formation of the glass fibers. The individual sized fibers were gathered into strands and collected on a forming tube mounted on a 20.32 centimeter collet which was rotating at 4,100 revolutions per minute. A plurality of forming packages as above formed was dried in an oven at 130° C. for 11 hours.

TABLE 3

| Component | Amount |
|---|---|
| Styrene-butadiene copolymer (Poly bd CS-15 ARCO Polymers, Inc.) | 30 grams |
| Tert-butyl peroxide | 3 grams |
| Polyoxyethylene (POE) (5) sorbitan monolaurate (Tween 81) | 75 grams |
| POE (20) stearyl ether (Brig - 78) | 75 grams |
| POE (4) sorbitan monolaurate (Tween 21) | 75 grams |
| Polyoxyethylated vegetable oil nonionic surfactant (Emulphor EL-719) | 75 grams |
| Silicon Surfactant (UC L-77) | 25 grams |
| Hot Water | 1,000 grams |
| Water | 2,000 grams |
| Ammonium Sulfate | 5 grams |
| Urea | 100 grams |
| High molecular weight polymers of ethylene oxide (Polyox WSR N-10 Union Carbide) | 75 grams |
| Polyethylene glycol (300MW Carbowax 300) | 100 grams |
| Melamine resin (Resimene 841) | 46 grams |
| Wax emulsion Mobilcer Q | 100 grams |
| Water | 2,000 grams |
| Gamma aminopropyltriethoxysilane (A-1100) | 60 grams |
| Polyamine silane (Z6050) | 60 grams |
| Maleic acid | 45 grams |

This sizing composition of Table 3 was prepared in the usual manner and had a solids content of 7 percent and was applied to K glass fibers.

EXAMPLE 4

In a preferred embodiment, a sizing composition having the formulation of Table 4 was prepared in a twenty (20) gallon (75.7 liter) batch and was used to treat glass fibers in the same method as used in Example 1.

TABLE 4

| Component | Amount gms/75.7 liters |
|---|---|
| Dicumyl peroxide (Dicup R) | 15 |
| Styrene-butadiene copolymer (Poly bd CS-15) | 835 |
| Polyoxyethylene (POE) (5) sorbitan monolaurate (Tween® 81) | 135 |
| POE (4) sorbitan monolaurate (Tween® 21) | 555 |
| Polyoxyethylated vegetable oil nonionic surfactant (Emulphor EL-719) | 135 |
| Water (160° F.) 71° C. | 1.9 liters |
| Polyamino-functional polyamide resin amine value 370-400 (General Mills Versamid 140) | 445 |
| Emery 4046 D | 265 |
| Water (Hot) | 3.785 liters |
| Polyethylene glycol MW = 300 (Carbowax 300) | 555 |
| Microcrystallene paraffin wax (Mobilcer Q) | 280 |
| Gamma-aminopropyltriethoxysilane (A-1100) | 555 |
| Silicone defoamer (SAG 470) | 8 mil. |

The above formulation was made into the sizing composition by forming an emulsion from the components: peroxide, SB-copolymer, POE (5), POE (4) and nonionic surfactant in 1.9 liters of water at 71° C. This emulsion was combined with a mixture of polyamide resin, in 3.8 liters of hot water. Then the glycol, wax emulsion, silane and defoaming agent were combined with the components in the mixture to produce the sizing composition.

EXAMPLE 5

A sizing composition having the formulation of Table 5 was prepared in a ten (10) gallon (37.9 liter) batch and used to treat glass fibers in the same method as used in Example 1.

TABLE 5

| Component | Amount gms/10 gal. 37.9 liters |
|---|---|
| Styrene-butadiene copolymer (Arco's Poly bd CS-15) | 500 |
| Tween® 81 POE (5) sorbitan monolaurate | 200 |
| Polyoxyethylene (40) stearate ICI America Inc. Myrj-52 | 200 |
| Bis-peroxide (mixture of para and meta isomers of bis tert-butyl peroxide) diisopropylbenzene (Vulcup R) | 8.0 |
| Polyamide resin (Versamid 140) | 270 |
| Partially amidated polyamine with 1°, 2° or 3° amines (Emery 4046 D) | 160 |
| Polyethylene glycol (300 MW) Carbowax 300 | 330 |
| Water (Hot) | 3.79 liters |
| Wax emulsion (Mobilcer Q) | 230 |
| Gamma-aminopropyltriethoxysilane | 330 |

This sizing composition was prepared by emulsifying in water at a temperature around 71° C. the components: styrene-butadiene copolymers, POE (5) sorbitan monolaurate, stearate, and peroxide. The emulsion was combined with a mixture of polyamide resin, amidated polyamine and glycol in hot water. Then the wax emulsion and silane were combined with the above components to produce the sizing composition.

EXAMPLE 6

Another sizing composition was prepared in a ten (10) gallon (37.9 liter) batch as in Example 3, having the formulation of Table 6. This sizing composition was used to treat glass fibers in the same method as in Example 1.

TABLE 6

| Component | Amount gms/10 gal. 37.9 liters |
|---|---|
| Styrene butadiene copolymer (Arco Poly bd CS-15) | 500 |
| Bis-peroxide (Vulcup R) | 9 |
| Tween 81 POE sorbitan monolaurate | 100 |

TABLE 6-continued

| Component | Amount gms/10 gal. 37.9 liters |
|---|---|
| Tween 20 POE (20) sorbitan monolaurate | 300 |
| Polyamide resin (General Mills Versamid 140) | 270 |
| Partially amidated polyamine with 1°, 2° and 3° amines (Emery 4046 D) | 160 |
| Polyethylene glycol (300 MW) Carbowax 300 | 330 |
| Hot Water | 1.0 Gal (3.785 l) |
| Wax emulsion (Mobilcer Q) | 230 |
| Gamma-aminopropyltriethoxy silane (A-1100) | 330 |

The sizing composition had a solids content of 5.23% and a pH of 10.6.

We claim:

1. An aqueous sizing composition for treating glass fibers to yield a sized glass fiber strand having reduced tackiness, comprising:
(a) one or more low molecular weight liquid polymers selected from the group consisting of styrene-butadiene copolymers, acrylonitrile-butadiene copolymers, hydroxy or carboxy terminated derivatives of these copolymers; 1,2-epoxy polymers having unsaturation or a replaceable hydrogen in the polymer backbone or at a pendant position; unsaturated polyester polymers prepared from at least one polyhydric alcohol and polycarboxylic acid or anhydride; and liquid polyurethane polymers produced from isocyanates and polyols and where the liquid polymer is curable with free radical generators; and
(b) a free radical generator selected from the group consisting of peroxides and hydroperoxides in an amount in the range of about 0.2 to about 5 parts per 100 parts of liquid polymer, and
(c) water.

2. Aqueous sizing composition of claim 1 which includes one or more nonionic surfactants.

3. Aqueous sizing composition of claim 1 which includes one or more lubricants.

4. Aqueous sizing composition of claim 1 which includes one or more amino silane coupling agents.

5. Aqueous sizing composition of claim 1 which includes urea.

6. Aqueous sizing composition of claim 1 which includes polyethylene glycol.

* * * * *